(12) United States Patent
Park et al.

(10) Patent No.: US 12,482,174 B2
(45) Date of Patent: Nov. 25, 2025

(54) METHOD FOR SIMULTANEOUSLY PRODUCING 2D CONTENT AND 3D CONTENT, AND CONVERGENCE PRODUCTION DEVICE THEREFOR

(71) Applicant: FAMPPY INC., Anyang-si (KR)

(72) Inventors: Hae Jin Park, Guro-gu Seoul (KR); Sang Yong Lee, Guro-gu Seoul (KR); Hyun Jin Park, Guro-gu Seoul (KR); Gun Young Lee, Gwanak-gu Seoul (KR); Hyo Jeong Chang, Seoul (KR)

(73) Assignee: FAMPPY INC. (KR)

( * ) Notice: Subject to any disclaimer, the term of this patent is extended or adjusted under 35 U.S.C. 154(b) by 0 days.

(21) Appl. No.: 17/920,295

(22) PCT Filed: Sep. 21, 2022

(86) PCT No.: PCT/KR2022/014134
§ 371 (c)(1),
(2) Date: Oct. 20, 2022

(87) PCT Pub. No.: WO2024/025034
PCT Pub. Date: Feb. 1, 2024

(65) Prior Publication Data
US 2024/0273814 A1    Aug. 15, 2024

(30) Foreign Application Priority Data
Jul. 29, 2022 (KR) .................. 10-2022-0094932

(51) Int. Cl.
*G06T 15/00* (2011.01)
*G06T 17/00* (2006.01)
*G06V 20/40* (2022.01)

(52) U.S. Cl.
CPC .............. *G06T 17/00* (2013.01); *G06V 20/44* (2022.01)

(58) Field of Classification Search
CPC ......... G06T 17/00; G06T 19/00; G06T 17/20; G06T 15/10; G06T 15/00; G06T 13/40;
(Continued)

(56) References Cited

U.S. PATENT DOCUMENTS

| | | | |
|---|---|---|---|
| 2004/0243374 A1* | 12/2004 | Kundert | G01R 31/318357 |
| | | | 703/14 |
| 2004/0264428 A1 | 12/2004 | Choi et al. | |
| 2005/0249117 A1 | 11/2005 | Gerkins | |
| 2007/0280156 A1 | 12/2007 | Kwon et al. | |
| 2008/0151848 A1 | 6/2008 | Fischer | |

(Continued)

FOREIGN PATENT DOCUMENTS

| KR | 1020100092618 A | 8/2010 |
|---|---|---|
| KR | 20110015759 A | 2/2011 |

*Primary Examiner* — Gordon G Liu
(74) *Attorney, Agent, or Firm* — Lippes Mathias LLP

(57) ABSTRACT

A method by a convergence production device for simultaneously producing 2D content and 3D content according to the present disclosure including the steps of: generating a canvas for generating the content; disposing an element on the canvas; registering an event corresponding to the element; registering (1) an action that is a condition for performing a function corresponding to the event, (2) the function representing an attribute change and a specific action to be performed with respect to a target if the event is activated, and (3) the target that becomes a purpose of the function; and executing a result, if the event is detected, based on the action, and the result includes the function and the target, and the content includes the 2D content and the 3D content.

19 Claims, 12 Drawing Sheets

(58) Field of Classification Search
CPC ......... G06T 15/06; G06T 15/08; G06T 15/20;
G06T 15/04; G06T 2210/41; G06T
15/005; G06T 1/20; G06T 19/006; G06T
7/337; G06T 7/50; G06T 7/74; G06T
19/20; G06T 2200/04; G06T 2207/10016;
G06T 2207/30244; G06T 2219/024;
G06T 2219/2016; G06T 2210/12; G06T
2210/21; G06T 7/70; G06T 2207/20084;
G06V 20/44; G06V 20/20; G06F 16/51;
G06F 21/602; H04N 23/64; H04N 23/90;
H04N 23/611; H04N 23/635
USPC ........................................................ 345/419
See application file for complete search history.

(56) References Cited

U.S. PATENT DOCUMENTS

| | | |
|---|---|---|
| 2008/0192713 A1 | 8/2008 | Mighani et al. |
| 2009/0067389 A1 | 3/2009 | Lee et al. |
| 2009/0271512 A1 | 10/2009 | Jorgensen |
| 2010/0061350 A1 | 3/2010 | Flammer, III |
| 2010/0135177 A1 | 6/2010 | Liu |
| 2011/0103352 A1 | 5/2011 | Wentink |
| 2011/0207466 A1 | 8/2011 | Hegge |
| 2012/0063433 A1 | 3/2012 | Wentink |
| 2013/0028243 A1 | 1/2013 | Wentink et al. |
| 2013/0136066 A1 | 5/2013 | Kim et al. |
| 2014/0003414 A1 | 1/2014 | Choudhury |
| 2014/0226651 A1 | 8/2014 | Lim |
| 2016/0321832 A1* | 11/2016 | Blohmé ............... H04N 21/858 |
| 2019/0371279 A1* | 12/2019 | Mak ..................... G02B 27/017 |
| 2020/0372206 A1* | 11/2020 | Fialkow ................ G06F 16/958 |

\* cited by examiner

```
{
    "canvasList":
    [
        {
            "canvas": "horizon",
            "color": "FFFFFF",
            "contentType": "2d",
            "eventManager": {},
            "height": 495,
            "isDeleted": false,
            "ratio": "ratioA4",
            "resourceManager": {},
            "thumbnail": "contents/thumbs/76230691-1cd7-46cb-aa45-00
            "type": "CANVAS",
            "uuid": "ec3bb7e1b64344698a9fb2cc5b9839bf",
            "width": 701
        }
    ],
    "globalValue":
    [],
    "type": "CANVAS_MANAGER",
    "uuid": "72639b006ae947ebab8c8a55520aae7a"
```

FIG. 12

METHOD FOR SIMULTANEOUSLY PRODUCING 2D CONTENT AND 3D CONTENT, AND CONVERGENCE PRODUCTION DEVICE THEREFOR

BACKGROUND OF THE DISCLOSURE

The present disclosure relates to a method for a user to simultaneously produce 2D content and 3D content, and a convergence production device for supporting the same.

STATE OF THE ART

With the development of the Internet technologies, various types of multimedia content are growing fast based on a high-performance network environment in a 5G or 6G environment. As a super platform based on the users' participation, such as YouTube or TikTok, is activated, desires to create and distribute individual content are growing, and thus various types of authoring tools are appearing.

However, since general online content authoring tools are divided into 2D and 3D tools, it is difficult to produce mixed content by using the tools. Although there is an authoring tool that can produce 2D and 3D mixed content, such an authoring tool is required to be installed in a user terminal to be used or to be produced through a complicated development process. Accordingly, there is a problem in that the content production is difficult without professional knowledge.

Further, although web type authoring tools have been developed for user convenience and to make easy and simple production possible, interaction is not possible on the content or the tools are to just show the content in many cases. For this reason, it is difficult to produce the immersive participatory content.

Further, in case of producing various environments as one piece of content, there is a problem with the complexity of development and calculation, such as a method for calculating various environments as one piece of content and recognition of elements in the content.

SUMMARY OF THE DISCLOSURE

One object of the disclosure is to provide a production method capable of simultaneously producing 2D (plane) content and 3D (stereoscopic) content through one tool.

Further, one object of the disclosure is to provide a method for producing one piece of content by selecting and producing a production environment for each screen and interworking with elements for each screen with one another so that various environments can be produced in one piece of content.

Technical problems to be solved by the present disclosure are not limited to the above-described problems, and other unmentioned problems will be clearly understood by those of ordinary skill in the art to which the present disclosure pertains from the following detailed description of the present disclosure.

In an aspect of the present disclosure, a method by a convergence production device for simultaneously producing 2D content and 3D content may include: generating a canvas for generating the content; disposing an element on the canvas; registering an event corresponding to the element; registering (1) an action that is a condition for performing a function corresponding to the event, (2) the function representing an attribute change and a specific action to be performed with respect to a target if the event is activated, and (3) the target that becomes a purpose of the function; and executing a result, if the event is detected, based on the action, wherein the result includes the function and the target, and wherein the content includes the 2D type content and the 3D type content.

The method may further include receiving a command for generating the content from a terminal, wherein the terminal and the convergence production device communicate with each other through a world wide web (WEB).

The method may further include: registering a controller for controlling the element based on the canvas; and correcting an attribute value of the element by using the controller.

The method may further include: uploading a file of the element; loading the file of the element through a loader based on a file format of the element; generating an object based on the loaded file of the element; and registering a new element based on the object.

The canvas may include (1) an attribute of the canvas, (2) an event list, and (3) a resource list including information of the element.

The canvas may include (1) a resource manager for managing the element, and (2) an event manager for managing the event, wherein the resource manager may call the function in accordance with a change of the resource based on the resource list.

The canvas may include a history manager for storing changes of the controller.

The method may include: generating a channel corresponding to the content; and adding a work sharing user for performing work related to the content to the channel.

In another aspect of the present disclosure, a convergence production device for simultaneously producing 2D content and 3D content may include: a communication module; a memory; and a processor configured to functionally control the communication module and the memory, wherein the processor is configured to: generate a canvas for generating the content, dispose an element on the canvas, register an event corresponding to the element in the memory and register (1) an action that is a condition for performing a function corresponding to the event, (2) the function representing an attribute change and a specific action to be performed with respect to a target if the event is activated, and (3) the target that becomes a purpose of the function, and execute a result, if the event is detected, based on the action, wherein the result includes the function and the target, and the content includes the 2D content and the 3D content.

According to an embodiment of the present disclosure, a user can simultaneously produce 2D (plane) content and 3D (stereoscopic) content through one tool.

Further, according to an embodiment of the present disclosure, a user can produce one piece of content by selecting and producing a production environment for each screen and interworking with elements for each screen with one another so that various environments can be produced in one piece of content.

Effects that can be obtained from the present disclosure are not limited to those described above, and other unmentioned effects will be able to be clearly understood by those of ordinary skill in the art to which the present disclosure pertains from the following description.

BRIEF DESCRIPTION OF THE DRAWINGS

FIG. 12 is a block diagram illustrating an example of a canvas list to which the present disclosure is applicable.

Figure 1:
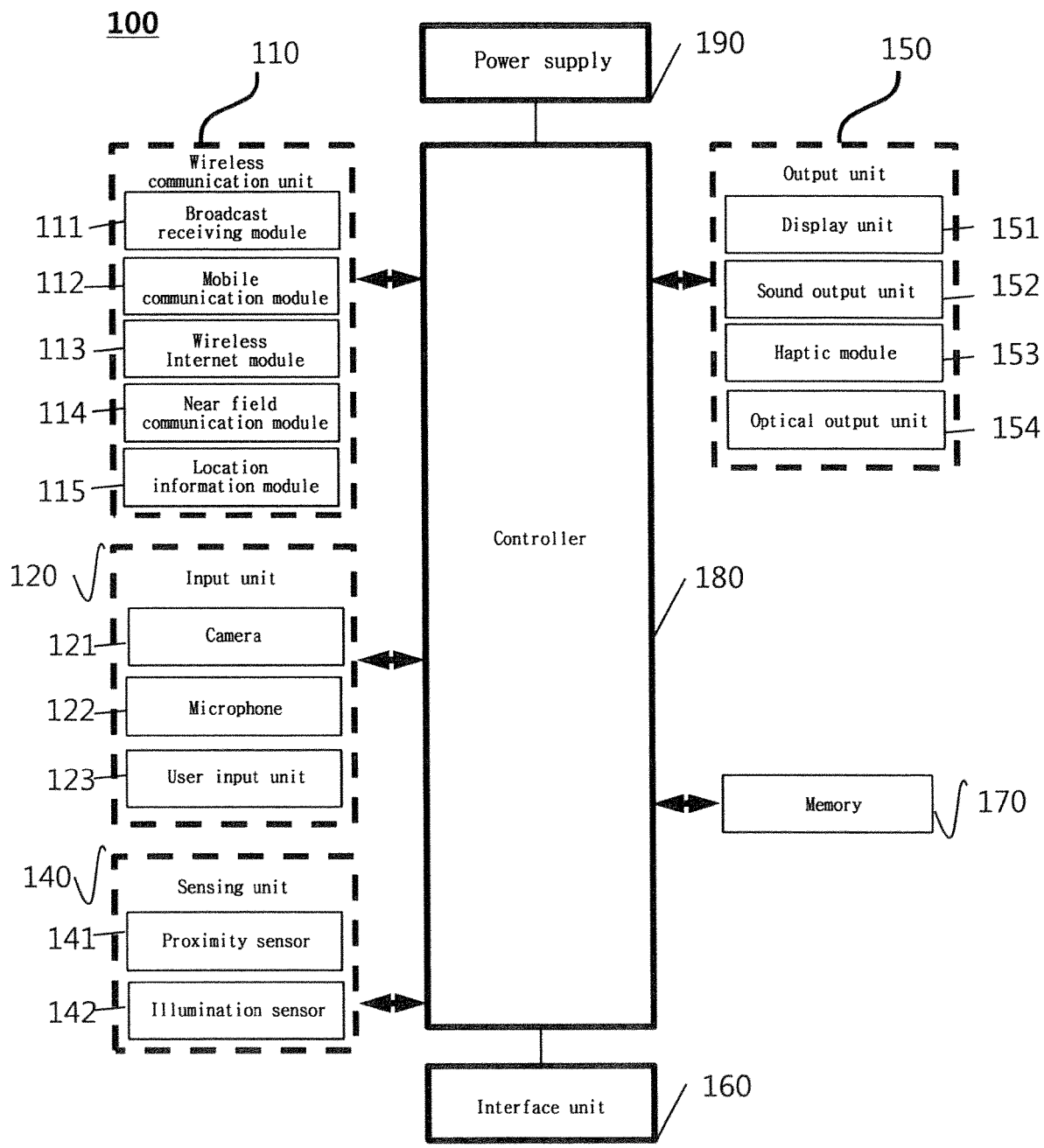
FIG. 1 is a block diagram illustrating an electronic device according to an embodiment of the present disclosure.

The accompanying drawings which are included as a part of the detailed description to help understanding of the present disclosure provide embodiments of the present disclosure, and describe the technical features of the present disclosure together with the detailed description.

DETAILED DESCRIPTION OF THE DISCLOSURE

Hereinafter, embodiments disclosed in the present disclosure will be described in detail with reference to the accompanying drawings. Regardless of the reference numerals, the same reference numerals are given to the same or similar constituent elements, and duplicate description thereof will be omitted. In the following description, suffixes "module" and "unit" for constituent elements, as used herein, are given or are interchangeably used in consideration of only easiness in preparing the present disclosure, but do not have mutually distinctive meanings or roles. Further, in explaining embodiments of the present disclosure, the detailed explanation of related known technologies will be omitted if it is determined that such explanation may obscure the subject matter of the embodiments disclosed in the present disclosure. Further, the accompanying drawings are only for easy understanding of the embodiments disclosed in the present disclosure, and it should be understood that the technical idea disclosed in the present disclosure is not limited by the accompanying drawings, but it includes all changes, equivalents, and substitutes included in the technical idea and the scope of the present disclosure.

Although terms including ordinal numbers, such as "first", "second", and so forth, may be used to describe various constituent elements, these constituent elements are not limited by the terms. The above-described terms are used only for the purpose of discriminating one constituent element from another constituent element.

When it is mentioned that a certain constituent element is "connected" or "linked" to another constituent element, it should be understood that the certain constituent element may be directly connected or linked to the other constituent element, or a still another constituent element may exist therebetween. In contrast, when it is mentioned that a certain constituent element is "directly connected" or "directly linked" to another constituent element, it should be understood that a still another constituent element does not exist therebetween.

A singular expression includes a plural expression, so long as it is clearly read differently on the context.

In the present disclosure, the terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

FIG. 1 is a block diagram explaining an electronic device related to the present disclosure.

An electronic device 100 may include a wireless communication unit 110, an input unit 120, a sensing unit 140, an output unit 150, an interface unit 160, a memory 170, a controller 180, and a power supply unit 190. The constituent elements illustrated in FIG. 1 are not essential in implementing the electronic device, and the electronic device explained in the description may have constituent elements the number of which is larger or smaller than the constituent elements enumerated above.

More specifically, among the constituent elements, the wireless communication unit 110 may include one or more modules that enable wireless communication between the electronic device 100 and a wireless communication system, between the electronic device 100 and another electronic device 100, or between the electronic device 100 and an external server. Further, the wireless communication unit 110 may include one or more modules that connect the electronic device 100 to one or more networks.

The wireless communication unit 110 may include at least one of a broadcast receiving module 111, a mobile communication module 112, a wireless Internet module 113, a near field communication module 114, and a location information module 115.

The input unit 120 may include a camera 121 or an image input unit for an image signal input, a microphone 122 or an audio input unit for an audio signal input, and a user input unit 123 (e.g., touch key or mechanical key) for receiving information from a user. Audio data or image data collected by the input unit 120 may be analyzed and processed as a user's control command.

The sensing unit 140 may include one or more sensors for sensing at least one of information in the electronic device, surrounding environment information of the electronic device, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared (IR) sensor, a fingerprint scan sensor, an ultrasonic sensor, an optical sensor (e.g., camera (refer to 121)), a microphone (refer to 122), a battery gauge, an environment sensor (e.g., barometer, hygrometer, thermometer, radiation detection sensor, thermal sensor, and gas detection sensor), and a chemical sensor (e.g., electronic nose, healthcare sensor, and biometric sensor). Meanwhile, the electronic device disclosed in the present disclosure may combine and utilize information being sensed by at least two of the sensors described above.

The output unit 150 is for generating an output related to sight, hearing, or touch, and may include at least one of a display unit 151, a sound output unit 152, a haptic module 153, and an optical output unit 154. The display unit 151 may implement a touch screen by forming a mutual layer structure with the touch sensor, or by being integrally formed with the touch sensor. The touch screen may not only function as a user input unit 123 for providing an input interface between the electronic device 100 and the user but also provide an output interface between the electronic device 100 and the user.

The interface unit 160 serves as a path with various kinds of external devices connected to the electronic device 100. The interface unit 160 may include at least one of a wired/wireless headset port, an external charger port, wired/wireless data port, a memory card port, a port for connecting a device provided with an identification module, an audio input/output (I/O) port, a video input/output (I/O) port, and an earphone port. The electronic device 100 may perform a proper control related to a connected external device to correspond to the connection of an external device to the interface unit 160.

Further, the memory 170 stores therein data for supporting various functions of the electronic device 100. The memory 170 may store many application programs (or applications) being driven in the electronic device 100, data for an operation of the electronic device 100, and commands. At least some of such application programs may be downloaded from an external server through the wireless communication. Further, at least some of the application programs may exist in the electronic device 100 from the time of release for basic functions (e.g., call destination/origination functions and message receiving/sending functions) of the electronic device 100. Meanwhile, the application programs may be stored in the memory 170, installed in the electronic device 100, and driven by the controller 180 to perform the operation (or function) of the electronic device.

In addition to the operation related to the application programs, the controller 180 generally controls the overall operation of the electronic device 100. The controller 180 may provide or process proper information or functions to the user by processing signals, data, and information being input or output through the above-described constituent elements or by driving the application programs stored in the memory 170.

Further, in order to drive the application programs stored in the memory 170, the controller 180 may control at least some of the constituent elements described above with reference to FIG. 1. Further, in order to drive the application programs, the controller 180 may combine and operate at least two of the constituent elements included in the electronic device 100.

Under the control of the controller 180, the power supply unit 190 may receive an external power or an internal power, and supply the power to the constituent elements included in the electronic device 100. The power supply unit 190 may include a battery, and the battery may be a built-in battery or a replaceable battery.

At least some of the above-described constituent elements may cooperate and operate with one another in order to implement the operation, the control, or the control method of the electronic device according to various embodiments being described hereinafter. Further, the operation, the control, or the control method of the electronic device may be implemented in the electronic device through driving of the at least one application program stored in the memory 170.

In the present disclosure, the electronic device 100 may include a terminal and a convergence production device.

Figure 2:
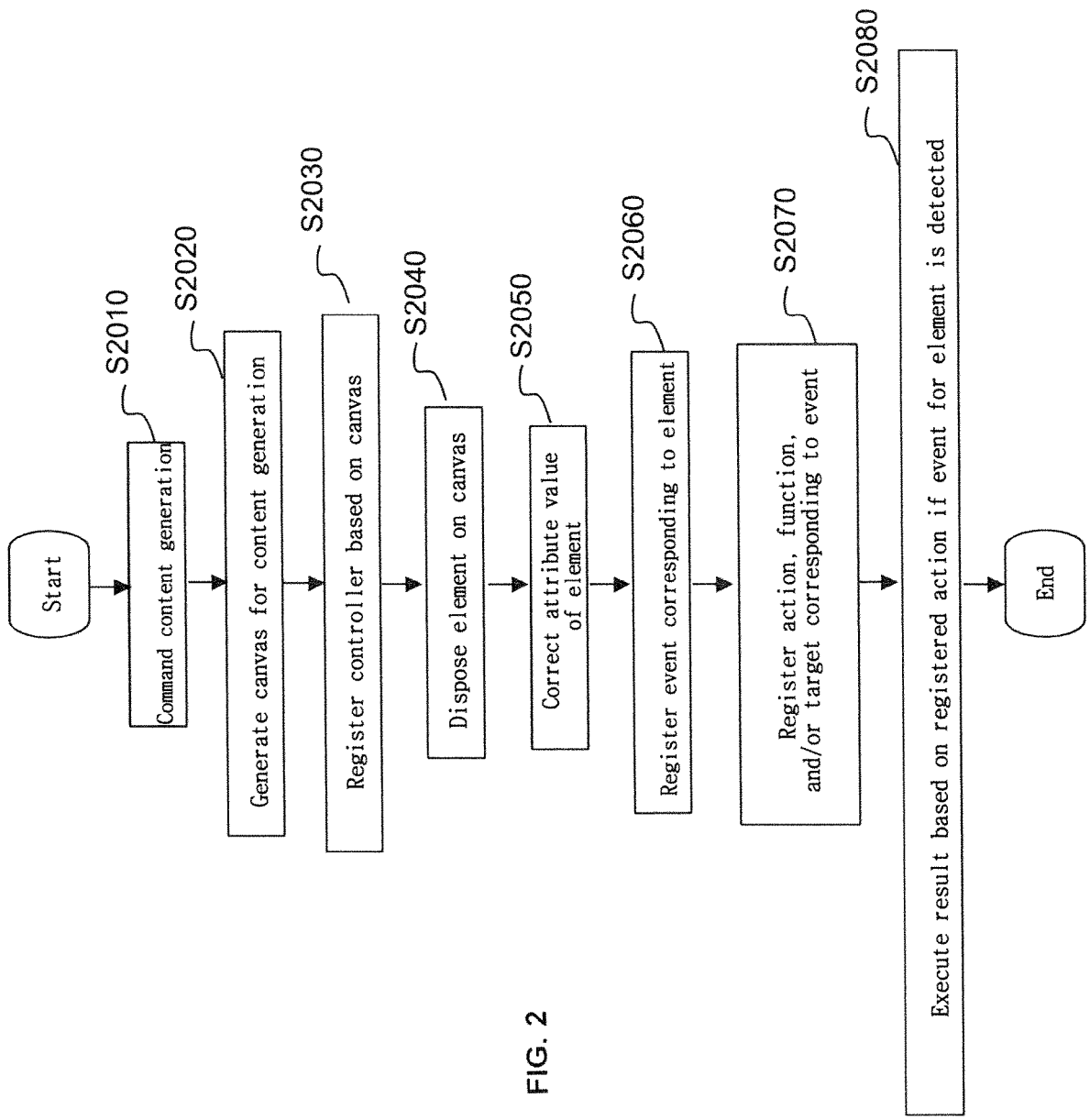
FIG. 2 illustrates an embodiment of the present disclosure.

FIG. 2 illustrates an embodiment to which the present disclosure is applicable.

Referring to FIG. 2, a user may communicate with a convergence production device through a terminal. For example, the terminal may be connected to the convergence production device through the WEB even without a separate application, and the user can simultaneously produce 2D content and 3D content through the terminal.

The convergence production device receives a content generation command from the terminal through the WEB (S2010). For example, the content may include 2D and/or 3D objects.

For the content generation, the convergence production device generates a canvas (S2020). For example, the canvas may include a canvas that can be expressed in 2D or 3D form, and the convergence production device may configure a screen by adding and disposing a predefined element or template to and on each canvas. More specifically, an event may be registered in the added element, and an interaction with a content user may be added. Through this, the user can produce the immersive and creative content.

Figure 3:
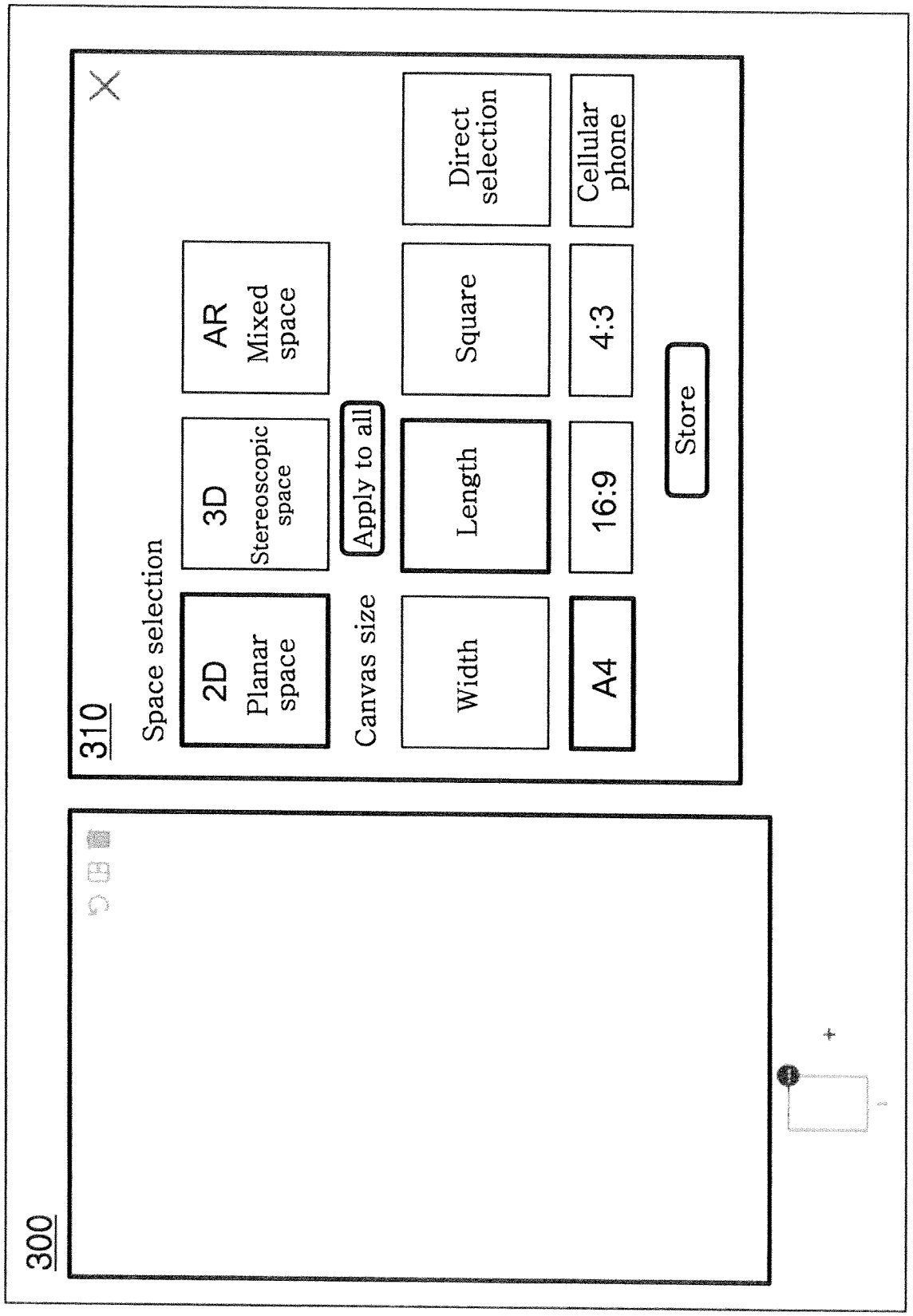
FIG. 3 illustrates an example of canvas generation to which the present disclosure is applicable.

FIG. 3 illustrates an example of canvas generation to which the present disclosure is applicable.

Referring to FIG. 3, a user may be provided with a canvas display screen 300 from a convergence production device through a terminal. For example, one piece of content may include one or more canvases. Further, the user may change the canvas form to 2D or 3D through a layout selection window 310 that can be represented on the canvas display screen 300, and may separately add a virtual space having a special function in accordance with needs of the content user, such as an AR mode. The convergence production device may register a separate controller 400 in accordance with the canvas form. Further, the user may change the size and the ratio of the canvas through the layout selection window 310.

Referring again to FIG. 2, the convergence production device may register the controller 400 based on the canvas (S2030). For example, the convergence production device may register the controller 400 that can control and interact with the elements in accordance with the canvas form.

Figure 4:
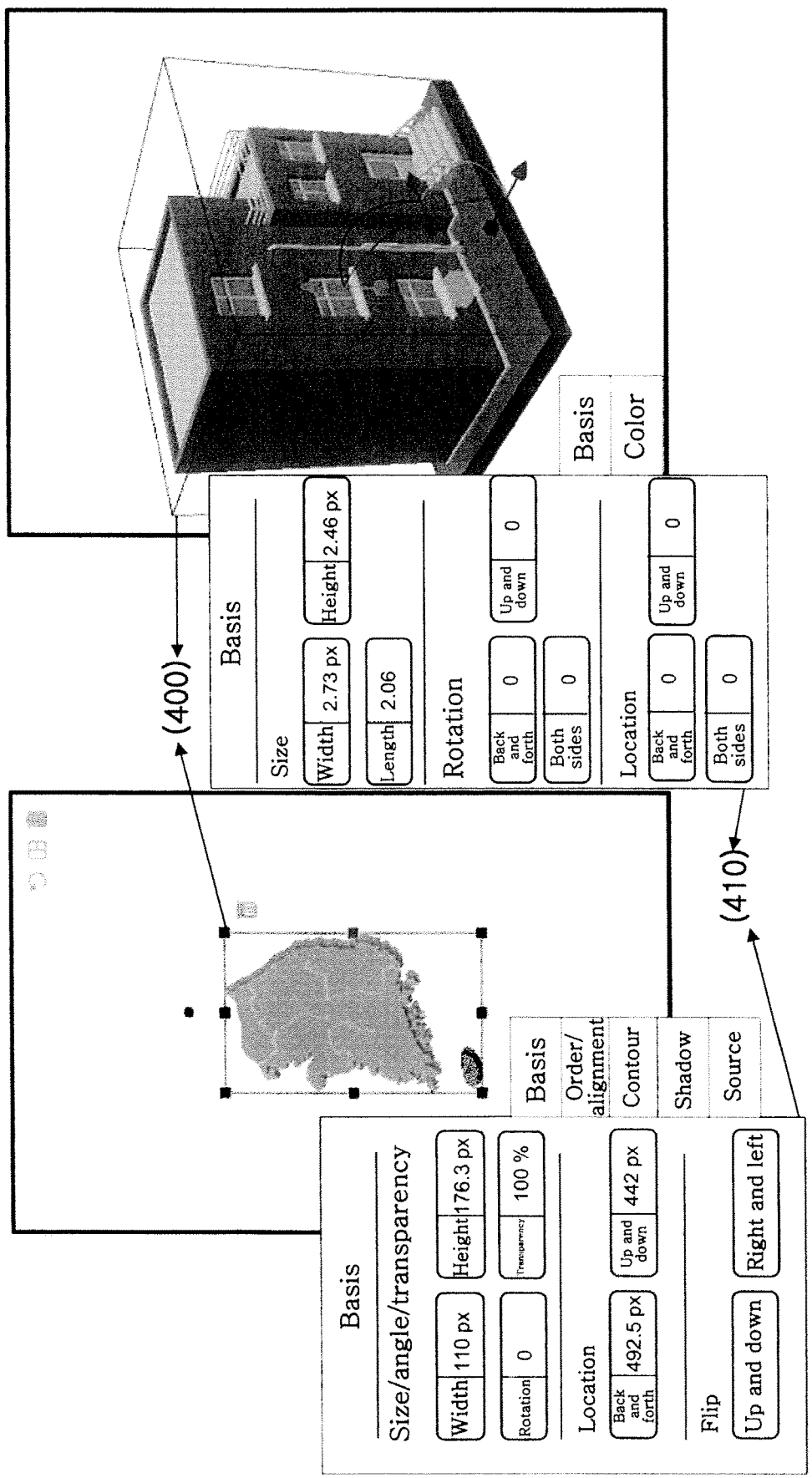
FIG. 4 illustrates an example of a controller 400 which is applicable to the present disclosure.

FIG. 4 illustrates an example of a controller 400 which is applicable to the present disclosure.

Referring to FIG. 4, if a user selects an element through a terminal, an attribute that matches the corresponding element is displayed on an attribute window 410, and a convergence production device may display the registered controller 400, and the user can easily edit the attribute by using a mouse or a touch through the usage of the controller 400. For example, the user may minutely correct the attribute value of the element by inputting an accurate numerical value on the attribute window 410. The user may perform an additional connected function by adding a tap on the attribute window 410. For example, the additional connected function may include a source of a producer of the element or media playback information.

Referring again to FIG. 2, the convergence production device disposes the element on the canvas (S2040). For example, the convergence production device may dispose a predefined element/template and/or an additionally uploaded element in accordance with the canvas form.

Figure 5:
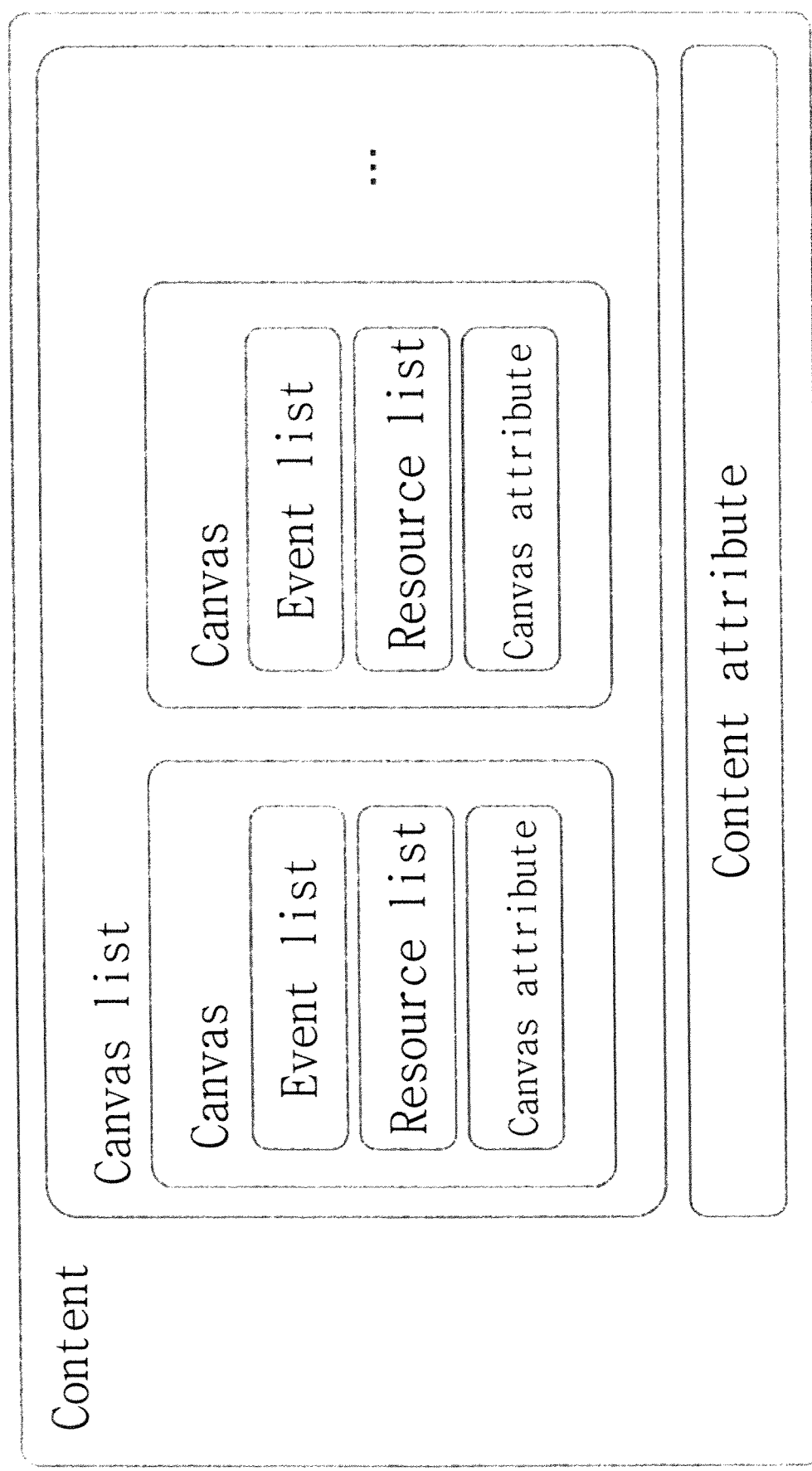
FIG. 5 illustrates an example of a canvas list to which the present disclosure is applicable.

FIG. 5 illustrates an example of a canvas list to which the present disclosure is applicable.

Referring to FIG. 5, one piece of content may be composed of a bundle of several canvases (screens), and 2D or 3D screen may be selected in accordance with user's needs.

For example, the canvas includes (1) an attribute of the canvas, (2) an event list, and (3) a resource list. More specifically, the event list includes information on events allocated to the element, and the resource list includes information on elements added to the canvas.

Figure 6:
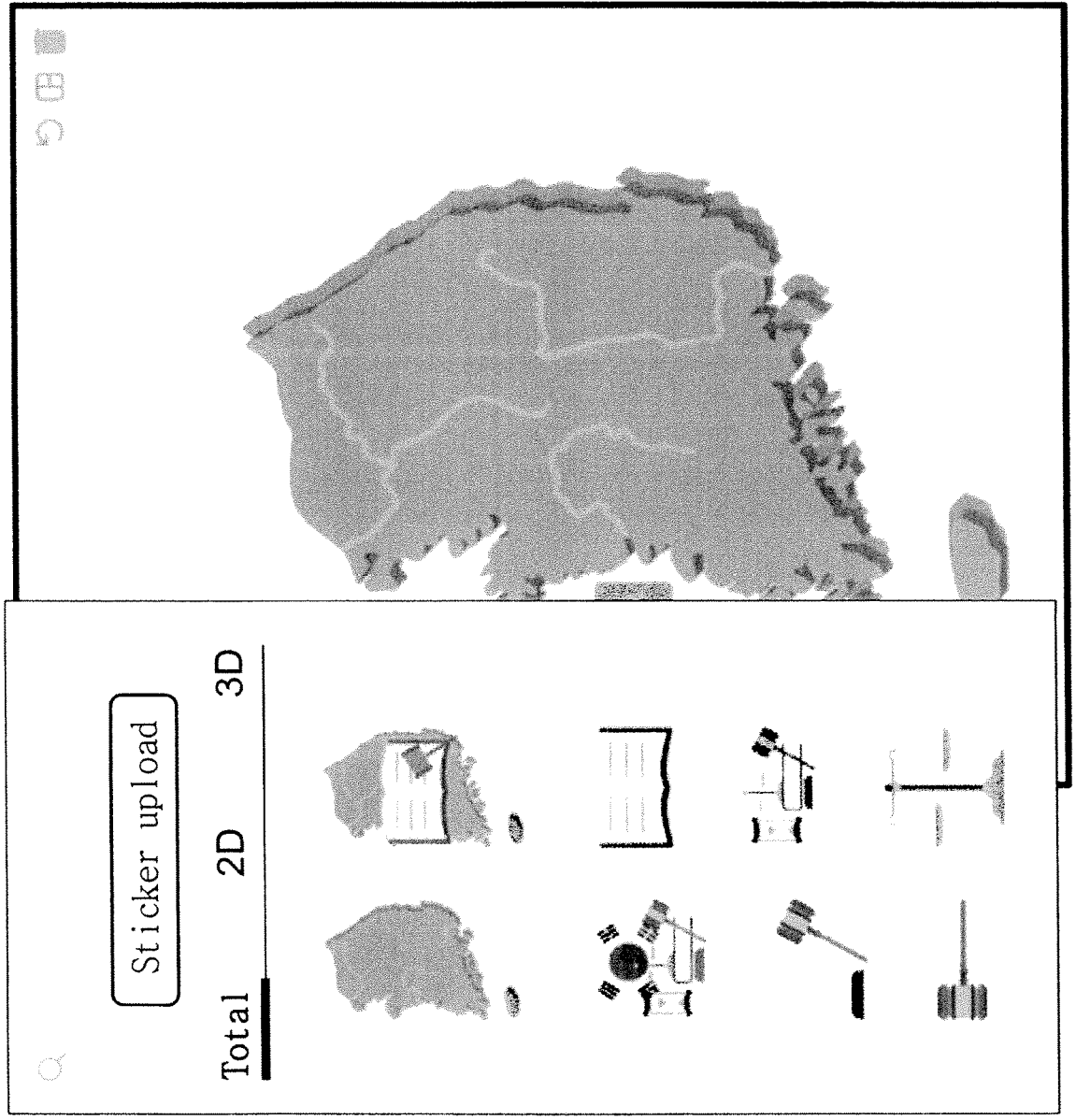
FIG. 6 illustrates an example of elements to which the present disclosure is applicable.

FIG. 6 illustrates an example of elements to which the present disclosure is applicable.

Referring to FIG. 6, a convergence production device may provide a predefined element/template to a user through a terminal in accordance with a canvas form. Further, the user may additionally upload and dispose the element.

Referring again to FIG. 2, the convergence production device corrects the attribute value of the element (S2050).

For example, if the user selects the element disposed on a canvas display screen 300, the convergence production device may display the attribute window 410 corresponding to the corresponding element, and the user may correct the attribute value through a mouse, touch, or numeric input by using the controller 400 registered based on the canvas.

The convergence production device registers the event corresponding to the element (S2060). For example, the event may include a set of an "action" and the "result". More specifically, the action may define the condition of the event occurrence. For example, the "action" may be the condition for performing a function, and may include various forms of events or calls, such as a keyboard event, a mouse/touch event, a gesture event, an area event, a value event, and a call event.

Further, the result may include a "function" and a "target".

More specifically, if the event is activated, the "function" may define an attribute change and a specific action to be performed with respect to the target that becomes the purpose of the function, and may include basic attributes of elements, such as a location, size, rotation, and transparency, and a control function for media elements, such as a view, hide, play, stop, and pause. Further, the function may include a camera, a GPS, and an accelerometer of a user terminal for utilization of information of an external environment.

The convergence production device registers the action, the function, and/or the target corresponding to the event (S2070). For example, the convergence production device may register the action, the function, and/or the target based on the attribute value of the element.

If the event for the element is detected, the convergence production device executes the result based on the registered action (S2080).

Figure 7:
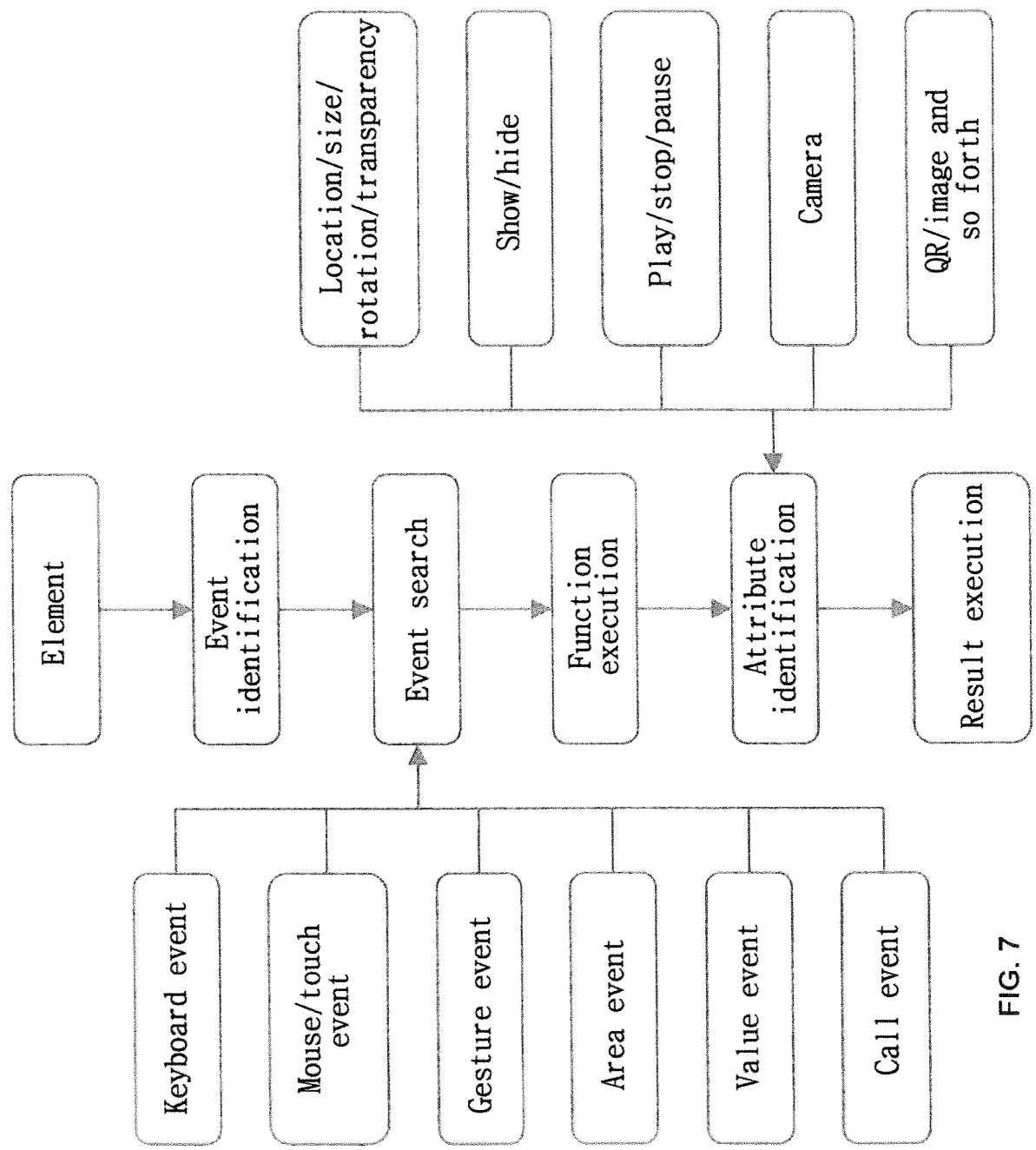
FIG. 7 is a block diagram illustrating an example of event detection of a convergence production device to which the present disclosure is applicable.

FIG. 7 illustrates an example of event detection of a convergence production device to which the present disclosure is applicable.

Referring to FIG. 7, the convergence production device may detect the event by identifying the event corresponding to the element and monitoring the event. If the event is detected, the convergence production device may identify the attribute in order to execute the function corresponding to the event, and may execute the result based on the function and the attribute.

Figure 8:
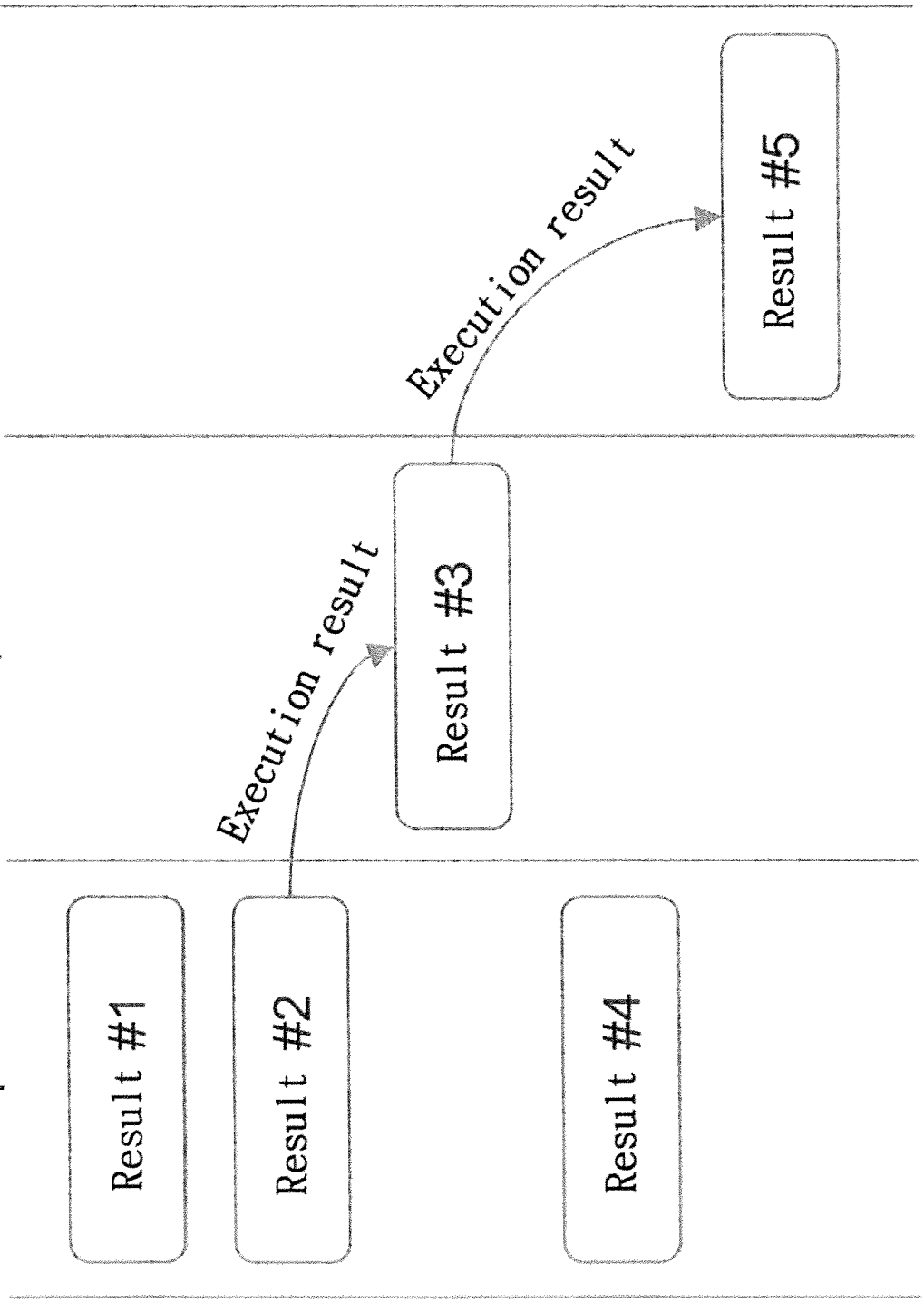
FIG. 8 is a block diagram illustrating an example of a result execution method to which the present disclosure is applicable.

FIG. 8 illustrates an example of a result execution method to which the present disclosure is applicable.

Referring to FIG. 8, the convergence production device may simultaneously execute the "results", and the low-level "result" may be connected to the high-level "result", and may be continuously executed. Further, the connection of the "results" is not limited, and by using the execution result of the high-level "result", a continuous function may be performed at the next step. Unlike the execution method that is driven as one simple timeline, the above-described result execution method may provide the user with the same environment as the environment of the actual programming technique in relation to the operation of the element, and may help natural learning of the programming environment.

Figure 9:
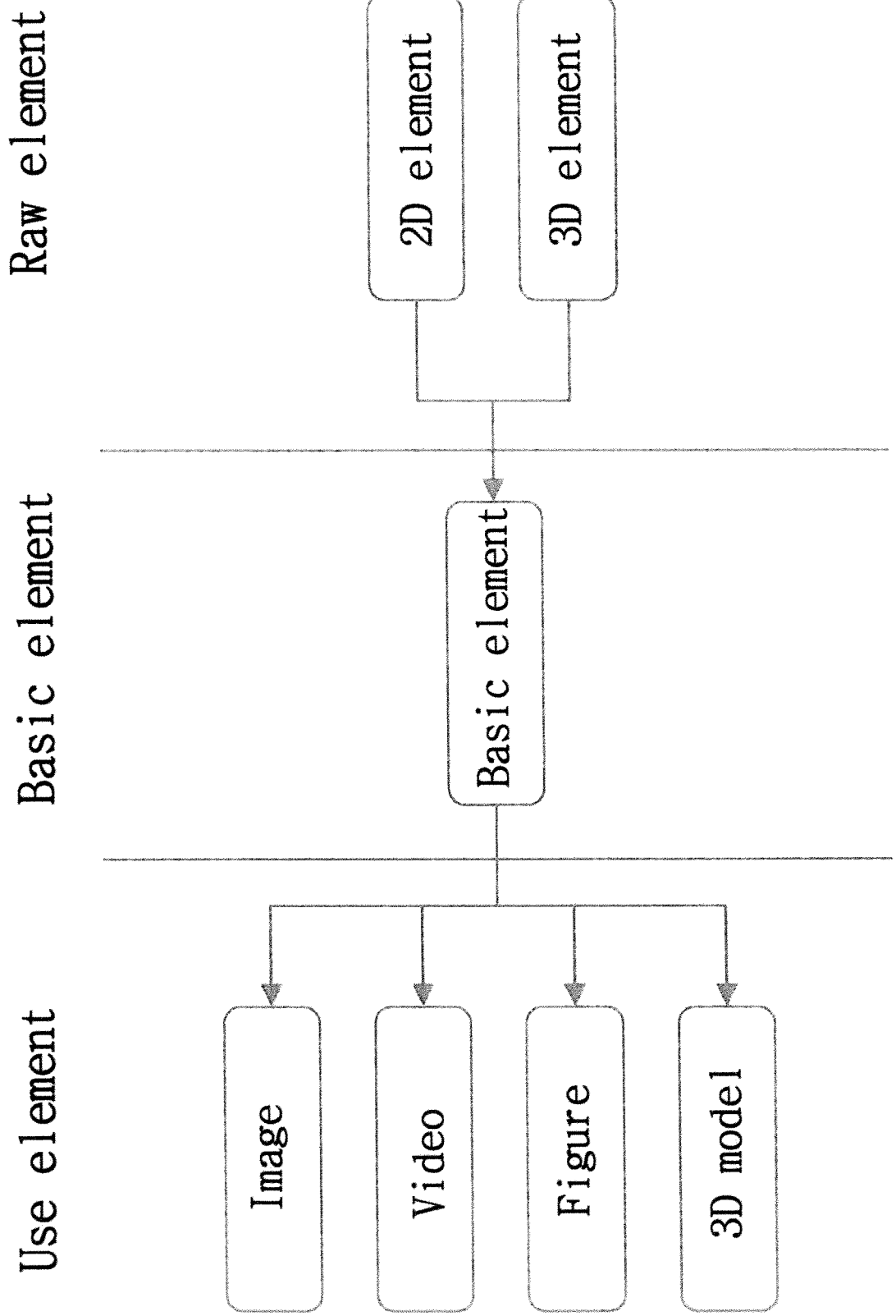
FIG. 9 is a block diagram illustrating an example of element management to which the present disclosure is applicable.

FIG. 9 illustrates an example of element management to which the present disclosure is applicable.

Referring to FIG. 9, the 2D type element and the 3D type element have different attributes, and thus it is difficult for the convergence production device to control the elements in the same manner. Accordingly, the convergence production device manages the elements by first surrounding the 2D type element and the 3D type element through an object called a "basic element", and by expansively using a "use element" that is used in an authoring tool of the convergence production device based on the "basic element". For example, the function of the "use element" may be configured to control and use the characteristic of a "raw element". More specifically, although an image, a video, a figure, or a 3D model is exemplified as the "use element" in FIG. 9, any shape that is favorable to control and display the characteristics of the 2D type element and the 3D type element can be displayed as the "use element".

Figure 10:
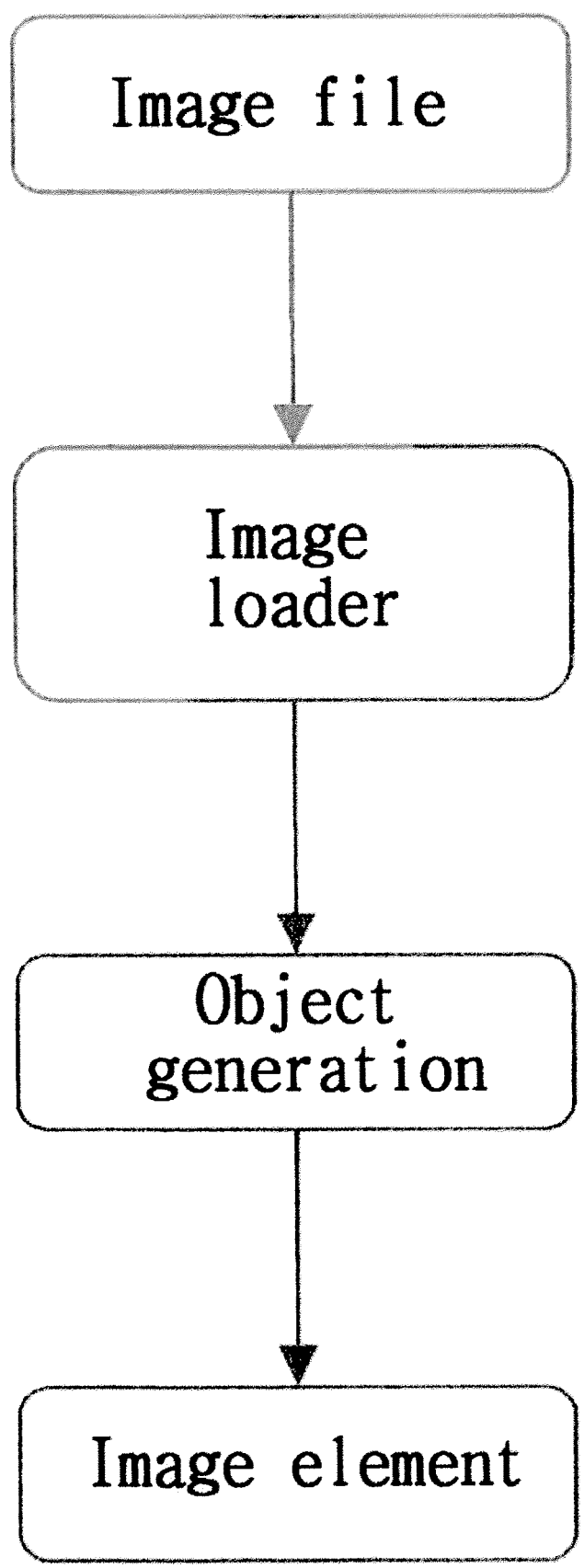
FIG. 10 is a block diagram illustrating an example of element upload to which the present disclosure is applicable.
Figure 11:
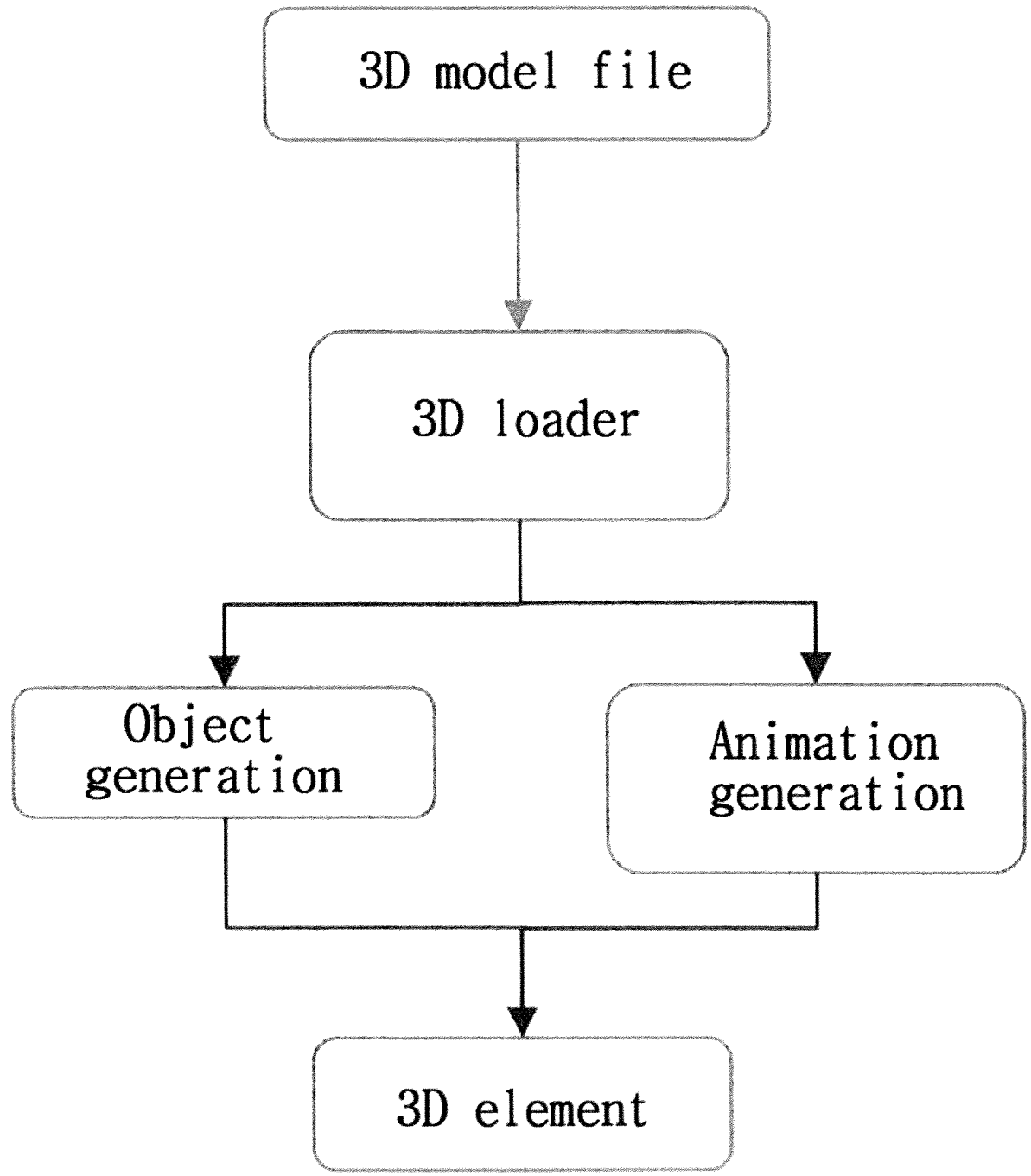
FIG. 11 is a block diagram illustrating an example of element upload to which the present disclosure is applicable.

FIGS. 10 and 11 illustrate an example of element upload to which the present disclosure is applicable.

Referring to FIGS. 10 and 11, the convergence production device loads an uploaded element file through a loader, and registers an object of the loaded element file in the "use element" that can correspond to the loader. The convergence production device may dispose the uploaded element by using the registered "use element".

Referring to FIG. 10, if the uploaded element file is an image file, the convergence production device may load the corresponding image file through an image loader, and may register an object of the loaded image file as an image element.

Referring to FIG. 11, if the uploaded element file is a 3D model file, the convergence production device may load the corresponding 3D model file through a 3D loader, generate an object of the loaded 3D model file, and may register the corresponding object as the 3D element by generating an animation and adding the generated object to the animation.

For example, if the uploaded element file is a video file, the convergence production device may generate and add HTMLVideoElement to a screen, and then may register the object in the "use element" to control the object.

FIG. 12 illustrates an example of a canvas list to which the present disclosure is applicable.

Referring to FIG. 12, one piece of content may include several canvases, and each canvas may include "resource-Manager" that manages the elements and "eventManager" that manages an operation event.

The element disposed on the canvas may have a separate depth, and the convergence production device may adjust the order of exposure of the element on the screen by adjusting the depth in accordance with the user's needs.

For example, if the element is disposed, the convergence production device may register the corresponding element in a resource manager of the corresponding canvas, and may manage the corresponding element through changes, registration, or deletion of the attribute or the state thereof. The resource manager may manage the disposed element, generate an event for the changes, and call the connected function in accordance with the change of the resource based on the resource list.

If the element is added, the convergence production device may add the element to a management list in order to control the element through the controller registered in the canvas, and may allow the controller to recognize and manage the controllable element. The attribute of the element registered in the controller may be corrected or controlled through the user's mouse, gesture, or touch, or an external controller.

Further, in the process in which the user controls the element, redo/undo functions may be necessary. For this, the convergence production device may be configured to record the changes of the state of the corresponding element by storing the changes of the controller in the history manager of the canvas, and if requested, to restore or update again the element state by updating the current element attribute through calling of the attribute of the element from the list of changes stored in the history manager. Since the changes are stored for each element in the history manager, a memory problem may occur. Accordingly, in order to prevent this, the convergence production device may limit the number of lists of changes being stored depending on the situation.

Further, the convergence production device may designate a shared user during content production and allow the user and the shared user to simultaneously perform the work. For example, if the content is initially generated, the convergence production device may generate an inherent channel corresponding to the content. The convergence production device may designate the shared user who can use the inherent channel, and may add the shared user to the same channel if the user accesses the corresponding content.

The users on the same channel may send and receive the changes in real time, and may synchronize the produced data in real time. For this, the communication may be performed in real time through websocket or webrtc.

However, if a new user accesses a non-stored content, synchronization may be performed in the state of the content of the previous version, and thus a difference in version may occur. In order to prevent this, if a new user first accesses the content after being added to the shared channel, initial synchronization may be performed by performing an overall update for the work changes through a specific user among existing users that are working. After the initial synchronization is performed, the convergence production device can solve synchronization issues of the non-stored content through a method in which data for the changes is shared in real time.

As described above, it is possible to implement the present disclosure as a computer readable code in a medium in which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, and an optical data storage device, and may further include implementation in the form of a carrier wave (e.g., transmission through the Internet). Accordingly, the above-described detailed explanation should not be limitedly interpreted in all aspects, but should be illustratively considered. The scope of the present disclosure should be determined by reasonable interpretation of the appended claims, and all changes in an equivalent range of the present disclosure are included in the range of the present disclosure.

Further, although the present disclosure has been described mainly with reference to the services and embodiments, the services and embodiments are only for illustrative purposes, and do not limit the present disclosure. It can be understood by those of ordinary skill in the art to which the present disclosure pertains that various modifications and applications that are not exemplified above are possible in a range that does not deviate from the intrinsic characteristics of the services and the embodiments. For example, respective constituent elements appearing in detail in the embodiments may be modified and embodied. Further, it should be interpreted that differences related to such modifications and applications are included in the scope of the present disclosure prescribed in the appended claims.

What is claimed is:

1. A method by a convergence production device for simultaneously producing 2D content and 3D content, the method comprising the steps of:
    generating a canvas for generating the content;
    registering a controller for controlling an element based on the canvas;
    disposing the element on the canvas;
    correcting an attribute value of the element by using the controller;
    registering an event corresponding to the element;
    registering:
    an action that is a condition for performing a function corresponding to the event;
    the function representing an attribute change and a specific action to be performed with respect to a target if the event is activated; and
    the target that becomes a purpose of the function; and
    executing one or more results, if the event is detected, based on the action,
    wherein the result includes the function and the target, a low-level result is linked to a high-level result based on the high-level result, and
    wherein the content includes the 2D content and the 3D content.

2. The method of claim 1, further comprising the steps of:
    receiving a command for generating the content from a terminal, wherein the terminal and the convergence production device communicate with each other through a world wide web (WEB).

3. The method of claim 1, further comprising the steps of:
    uploading a file of the element;
    loading the file of the element through a loader based on a file format of the element;
    generating an object based on the loaded file of the element; and
    registering a new element based on the object.

4. The method of claim 1, further comprising the step of having the canvas comprise:
    an attribute of the canvas;
    an event list; and
    a resource list including information of the element,
    wherein the event list includes information on events allocated to the element, and the resource list includes information on elements added to the canvas.

5. The method of claim 4, further comprising the step of having the canvas comprise:
    a resource manager for managing the element; and
    an event manager for managing the event, wherein the resource manager calls the function in accordance with a change of the resource based on the resource list.

6. The method of claim 1, further comprising the step of having the canvas comprise a history manager for storing changes of the controller.

7. The method of claim 1, further comprising the steps of:
    generating a channel corresponding to the content; and
    adding a shared user for performing work related to the content to the channel.

8. A convergence production device for simultaneously producing 2D content and 3D content, the convergence production device comprising:
- a communication module;
- a memory; and
- a processor configured to functionally control the communication module and the memory, wherein the processor is configured to:
- generate a canvas for generating the content,
- control an element based on the canvas,
- dispose the element on the canvas,
- correct an attribute value of the element,
- register an event corresponding to the element in the memory and register:
- an action that is a condition for performing a function corresponding to the event;
- the function representing an attribute change and a specific action to be performed with respect to a target if the event is activated; and
- the target that becomes a purpose of the function; and
- execute one or more results, if the event is detected, based on the action, wherein the result includes the function and the target, a low-level result is linked to a high-level result based on the high-level result and wherein the content includes the 2D content and the 3D content.

9. The device of claim 8, wherein the processor is further configured to correct the attribute value by:
- receiving as input a user-selected element disposed on the canvas display screen;
- displaying an attribute window corresponding to a corresponding element; and
- receiving input from a controller registered based on the canvas.

10. The device of claim 8, wherein the action comprises the condition for performing a function, and includes at least one of a keyboard event, a mouse/touch event, a gesture event, an area event, a value event, and a call event.

11. The device of claim 8, wherein the function includes attributes of elements, including a location, size, rotation, and transparency, and a control function for media elements, including a view, hide, play, stop, and pause, and wherein the function includes a camera, a GPS, and an accelerometer of a user terminal for utilization of information of an external environment.

12. The device of claim 8, wherein the action comprises the condition for performing a function, and includes at least one of a keyboard event, a mouse/touch event, a gesture event, an area event, a value event, and a call event.

13. The device of claim 8, wherein the processor is further configured to register the action, the function, and the target based on the attribute value of the element.

14. The device of claim 8, wherein the processor is further configured to simultaneously execute the results continuously.

15. The device of claim 8, wherein the processor is further configured to manage the elements by first surrounding the 2D type element and the 3D type element through a basic element and next expansively using a use element in an authoring tool of the convergence production device based on the basic element, wherein a function of the use element is configured to control and use at least one characteristic of a raw element.

16. The device of claim 15, wherein the use element comprises an image, a video, a figure, or a 3D model.

17. The device of claim 8, wherein the content includes two or more canvases, and each canvas includes a resource manager that manages the elements and an event manager that manages an operation event,
- wherein, when the element is disposed, the processor is further configured to register the corresponding element in a resource manager of the corresponding canvas, and manage the corresponding element through changes, registration, or deletion of the attribute or the state thereof,
- wherein the resource manager manages the disposed element, generates an event for the changes, and calls the connected function in accordance with the change of the resource based on the resource list.

18. The device of claim 8, wherein the processor is further configured to:
- designate a shared user during content production and allow the user and the shared user to simultaneously perform the work;
- generate an inherent channel corresponding to the content;
- designate the shared user who can use the inherent channel; and
- add the shared user to the same channel when the user accesses the corresponding content.

19. The device of claim 18, wherein the processor is further configured to:
- perform initial synchronization by performing an overall update for work changes through a specific user among existing users that are working;
- solve synchronization issues of non-stored content through sharing data for the changes in real time.

* * * * *